United States Patent
Stacey et al.

(10) Patent No.: US 7,072,357 B2
(45) Date of Patent: Jul. 4, 2006

(54) FLEXIBLE BUFFERING SCHEME FOR MULTI-RATE SIMD PROCESSOR

(75) Inventors: Fred Stacey, Carleton Place (CA); Christian Bourget, Hull (CA); Yatish Kumar, Ottawa (CA)

(73) Assignee: Ciena Corporation, Linthicum, MD (US)

( * ) Notice: Subject to any disclaimer, the term of this patent is extended or adjusted under 35 U.S.C. 154(b) by 713 days.

(21) Appl. No.: 09/819,941

(22) Filed: Mar. 27, 2001

(65) Prior Publication Data

US 2002/0124154 A1 Sep. 5, 2002

(30) Foreign Application Priority Data

Mar. 31, 2000 (CA) ..................................... 2303604

(51) Int. Cl.
*H04J 3/22* (2006.01)
*G06F 15/00* (2006.01)
*G06F 15/76* (2006.01)

(52) U.S. Cl. .......................... 370/465; 712/14; 712/22
(58) Field of Classification Search ................ 370/412; 712/11, 20, 22
See application file for complete search history.

(56) References Cited

U.S. PATENT DOCUMENTS

| 5,045,995 | A | | 9/1991 | Levinthal et al. |
| 5,410,727 | A | * | 4/1995 | Jaffe et al. ................... 709/234 |
| 5,448,706 | A | * | 9/1995 | Fleming et al. ............. 711/217 |
| 5,463,732 | A | | 10/1995 | Taylor et al. |
| 5,790,879 | A | | 8/1998 | Wu |
| 5,822,606 | A | | 10/1998 | Morton |
| 6,079,008 | A | | 6/2000 | Clery |
| 6,330,657 | B1 | * | 12/2001 | Col et al. ...................... 712/23 |

* cited by examiner

*Primary Examiner*—Steven Nguyen
*Assistant Examiner*—Clemence Han
(74) *Attorney, Agent, or Firm*—Merek, Blackmon & Voorhees, LLC

(57) ABSTRACT

A single instruction, multiple data (SIMD) architecture for controlling the processing of plurality of data streams in a digital subscriber line (DSL) system has a memory for storing the data from the channels, a processor operatively coupled with the memory for processing data from the data streams, and a controller for controlling the processor. Storing the data in the memory de-couples the operating rate of the processor and the operating rate of the data streams.

15 Claims, 2 Drawing Sheets

FLEXIBLE BUFFERING SCHEME FOR MULTI-RATE SIMD PROCESSOR

The present invention relates to single instruction, multiple data (SIMD) processors. In particular, the present invention relates to rate buffering in digital subscriber line (DSL) systems.

BACKGROUND OF THE INVENTION

A single instruction, multiple data (SIMD) processor essentially consists of a single program control unit (PCU) that controls the data processing of any number of data channels. FIG. 1A illustrates one possible SIMD configuration, represented by the numeral 10. The PCU 12 is coupled to N data paths 13, implying a parallel-processing scheme. Each data path 13 is coupled to a data memory 14 and a processor 15.

FIG. 1B illustrates a second SIMD configuration, represented by the numeral 16. In this configuration, the sharing of the instruction is done serially by time division multiplexing the processing in a data path 18 for all channels. The data is, therefore, changed N times at the input to the data processor 15 for every instruction that is produced.

The advantages that the SIMD architecture provides are savings in both power consumption and area reduction when compared to a solution using dedicated processors for each data path, or channel. The savings come from having only one PCU 12 and one program memory. If the data path processor is also being time shared, as in FIG. 1B, further savings in area reduction are realized. However, the processor must be able run at higher speeds to accommodate multiple channels. Furthermore, simplifications are also made at a higher level, since there is only one program load to manage and track. Having only one program load reduces start-up times if download times are consuming a large portion of time.

As described in the various standards defining the different flavors of digital subscriber line (DSL) systems, the procedure from power-up to run time operation takes modems through a series of handshakes and initialization procedures. These procedures require the modems to handle different data rates while maintaining a constant carrier frequency profile. In a multiple channel system, the assumption is that all channels may not be in the same state at any given time.

The maintenance of the constant carrier frequencies facilitates reuse of program code to perform some of the necessary tasks such as fast Fourier transforms (FFTs), equalization and the like. However, the changing data rates make it difficult to use one processor for performing symbol-based operations on multiple channels. This is due to the fact that the modem cannot synchronize all channels with its own processing rate since the symbol rate for all channels is not equal. Therefore, the presence of different rates in a multi channel system precludes using a constant rate processor for all channels.

It is an object of the present invention to obviate or mitigate some of the above disadvantages.

BRIEF SUMMARY OF THE INVENTION

In accordance with the present invention, there is provided a single instruction multiple data (SIMD) architecture for controlling the processing of plurality of data streams. The SIMD architecture comprises a memory for storing the data from the channels, a processor operatively coupled with the memory for processing data from the data streams, and a controller for controlling the processor. Storing the data in the memory de-couples the operating rate of the processor and the operating rate of the data streams.

In accordance with a further aspect of the present invention, there is provided a method for controlling the processing of multiple data streams in a SIMD architecture. The method comprises the steps of storing data in a memory as it is received; determining, at predetermined times, whether all of said data has been received; providing a signal indicating that all of the data has been received; using the signal to determine which data to process; and processing the data.

BRIEF DESCRIPTION OF THE DRAWINGS

An embodiment of the invention will now be described by way of example only with reference to the following drawings, in which.

DETAILED DESCRIPTION OF THE INVENTION

Figure 1A:
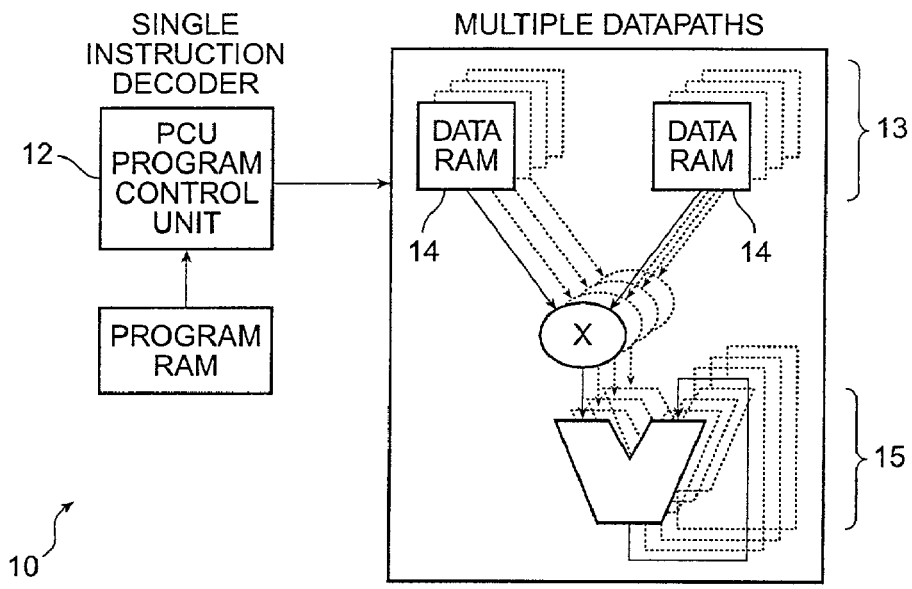
FIG. 1A is a block diagram of a standard SIMD architecture with multiple data paths.
Figure 1B:
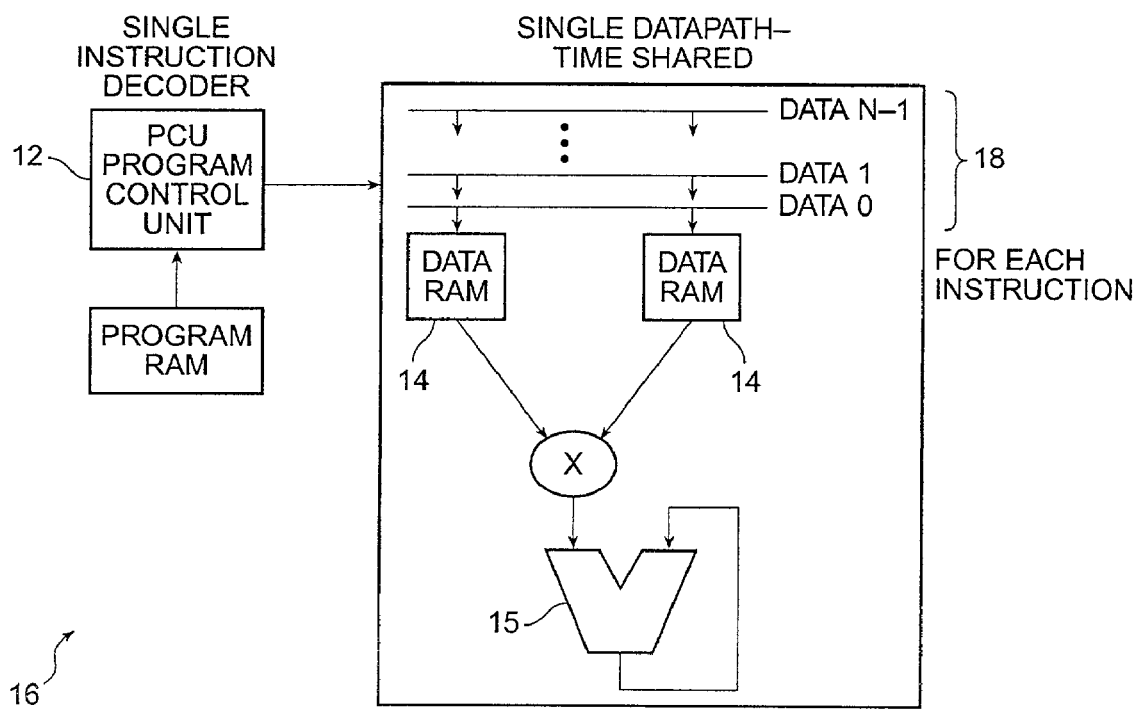
FIG. 1B is a block diagram of a standard SIMD architecture with a single, time-shared data path.

For convenience, in the following description like numerals refer to like structures in the drawings.

Figure 2:
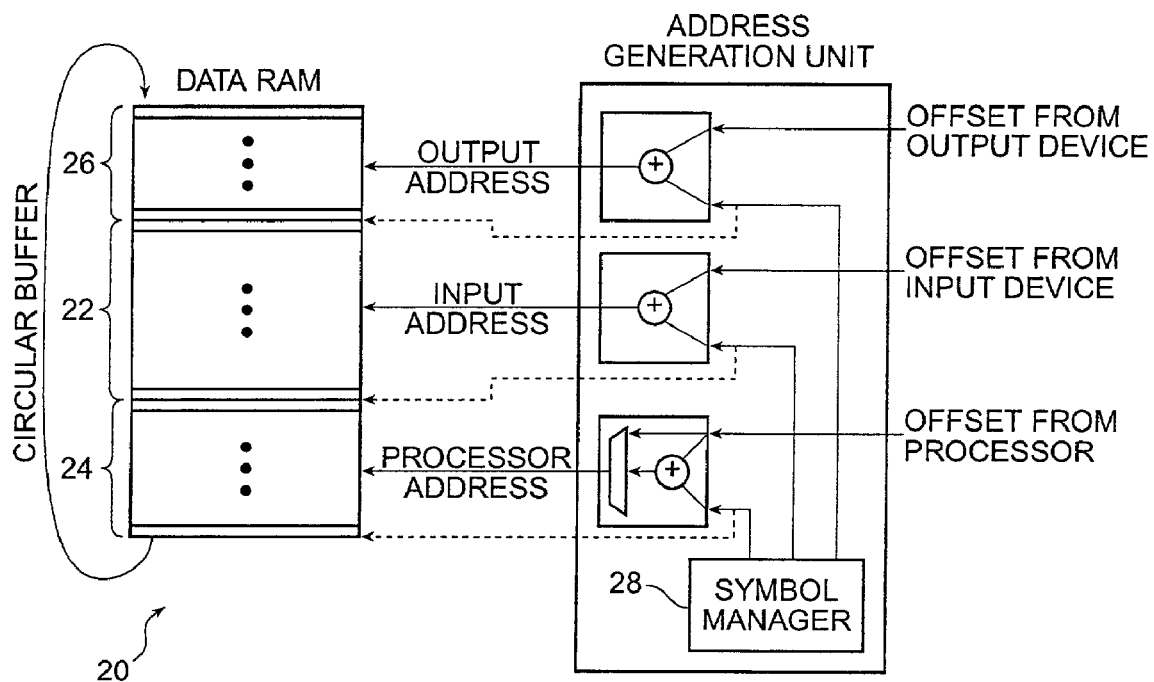
FIG. 2 is a block diagram of a circular buffer architecture.

FIG. 2 illustrates a circular buffer architecture, represented generally by the numeral 20. The circular buffer 20 is partitioned into three distinct sections. The first section 22 is for pre-processed symbols, the second section 24 is for present symbol processing, and the third section 26 is for post-processed symbol extraction. A symbol manager 28 is used for managing the locations of these symbols.

The buffer 20 may include an elastic region that is able to absorb data growth or depletion due to differences in rates of the three devices (output device, input device, and processor) that use the buffer 20. This region may hold up to one symbol, and may be located within the first section 22.

Figure 3:
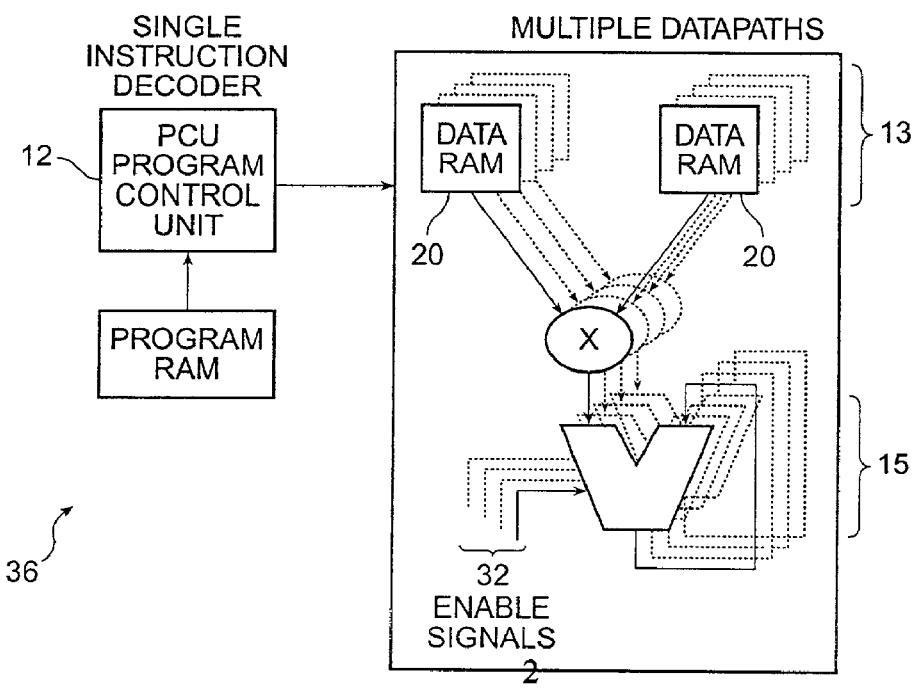
FIG. 3 is a block diagram of a SIMD architecture according to an embodiment of the invention.

FIG. 3 illustrates a SIMD architecture, represented by the numeral 36. The architecture 36 includes a PCU 12, multiple data paths 13, multiple data memories 14 and multiple processors 15. The architecture also includes enable signals 32, coupled to the processors 15.

Referring to FIG. 2, data is typically input serially into the pre-processed section 22. Once the data has been received, it is rotated to the present symbol processing section 24, where it is parallel-processed. Once the processing is complete, the symbol is rotated to the post-processed section 26 of the buffer 20, where it is output serially. Although the symbol is rotated through several sections of the buffer 20, its physical location does not necessarily chance. Changing the location of the symbol can be done; however, it would require more time and more memory.

Maintaining the same location for a particular symbol is accomplished since the buffer 20 is circular. Rather than have the address of the symbol physically rotate, the sections 22, 24, and 26 of the buffer 20 rotate about predetermined addresses. Therefore, an address that points to an incoming symbol is in the pre-processed section 22. Once the symbol has completely arrived and is being processed, the address that points to that symbol is in the processing section 24. Once the symbol has been processed, that address is considered to be in the post-processed section 26.

The symbol manager 28 locates the base address for each of the symbols, allowing the circular nature of the buffer 20 to be transparent to each device accessing the data. The input data enters the buffer 20 at an arbitrary data rate. The data is loaded sequentially into the pre-processed section 22 until a complete symbol is collected. At that point, the symbol manager 28 advances to the next base pointer location.

(As an added feature, the address generation unit can access the buffer 20 directly with the address offset from the processor without the addition of the base address from the symbol manager 28, by way of a switch. This allows the processor 15 to bypass the symbol manager 28 and access the buffer 28 absolutely.)

The PCU 12 indicates the start of a processing cycle with a start of processing (SOP) pulse. At each SOP pulse, the base pointer for the processing section 24 is compared to the base pointer for the incoming symbol (in the pre-processed section 22). The difference between these base pointers indicates whether or not a full symbol is ready for processing. If a full symbol is present, the enable signal 32 (shown in FIG. 3) for that symbol is activated. Otherwise, the enable signal 32 remains inactive and the comparison is done again at the next SOP. Therefore, only the processors 15 that have received a complete symbol are enabled.

As each of the devices completes processing its respective symbol, the symbol manager 28 advances the base pointer of the processing section 24 to the next symbol. Once the base pointer of the processing section 24 advances, the processed symbol is in the post-processed section 26. The extraction of the post-processed data is slaved to the processor 15, and is only performed after the symbol has been processed.

An advantage of this type of buffering scheme is that the processor is de-coupled from the incoming data rate of each channel. This is true with the restriction that the SOP of the processor is greater than or equal to the maximum baud rate of the channels. If this were not true, it is possible that incoming data could overwrite previously received data before it is processed. Therefore, the net processing rate of each channel is approximately equal to the baud rate for that channel since its processor 15 may be periodically disabled.

The rate at which any given channel is disabled (assuming zero jitter between each of the baud rates) is given by:

$$\% PROC_{OFF} = \frac{Fbaud_{SOP} - Fbaud_{CHAN}}{Fbaud_{SOP}}$$

This equation also indicates the "bursty" nature of the data output rate. That is, the output is provided in bursts—when the processor is enabled—rather than a constant steady stream. Also, the varying instantaneous latency due to the gapped processing can be determined.

Since the data is assumed to be arriving at a constant input rate, any gaps in the processing increase buffering requirements. However, since the worst case, or fastest, baud rate of the channel is equal to the baud rate of the processor, the buffering requirement is limited to the symbol size for each of the three sections 22, 24, and 26.

Implementing an SIMD in this manner provides several advantages. The architecture ultimately results in a net decrease in gate count and expended power, since the processors are only used for completely received symbols. Buffering requirements can be combined with those necessary for other considerations in the signal processing. Therefore, little or no extra memory is required. The structure can be applied to any symbol size. This includes processing on a sample by sample basis. The structure can be expanded to accommodate any number of channels. Lastly, this structure has direct applications to implementations of ITU G.992.2 (and other standards) for DSL systems, since the baud rate changes throughout operation.

In an alternate embodiment, it is possible that the data is received in parallel and the output transmitted in parallel.

In yet another embodiment, it is possible that the data is received serially and the output transmitted in parallel.

In yet another embodiment, it is possible that the data is received in parallel and the output transmitted serially.

It is possible to implement the system as described above using other SIMD implementations and will be apparent to a person skilled in the art.

Although the invention has been described with reference to certain specific embodiments, various modifications thereof will be apparent to those skilled in the art without departing from the spirit and scope of the invention as outlined in the claims appended hereto.

What is claimed is:

1. A single instruction, multiple data (SIMD) controller for processing a plurality of data streams in a digital subscriber line (DSL) system, comprising:
   a plurality of circular buffer circuits that store data from said plurality of data streams having independent data rates;
   a plurality of address generation circuits that access said data stored in said plurality of circular buffer circuits;
   a plurality of processor circuits that process said data accessed by said plurality of address generation circuits; and
   a program control unit that controls said plurality of processor circuits with an instruction.

2. The controller of claim 1, wherein one of said plurality of circular buffer circuits comprises:
   a first section that stores one or more symbols before being processed;
   a second section that stores said one or more symbols being processed; and
   a third section that stores said one or more symbols after being processed.

3. The controller of claim 1, wherein one of said plurality of address generation circuits comprises:
   a symbol manager circuit that generates an input base address, a processor base address, and an output base address,
   wherein said one of said plurality of address generation circuits further receives an input offset address, a processor offset address, and an output offset address, and generates an input address, a processor address, and an output address in accordance with said input base address, said processor base address, and said output base address.

4. The controller of claim 1, wherein said plurality of processor circuits further receive a plurality of enable signals and selectively process said data based on said plurality of enable signals.

5. The controller of claim 1, wherein said plurality of address generation circuits further selectively generate a plurality of enable signals, depending upon whether a full symbol is ready for processing in each of said plurality of address generation circuits.

6. The controller of claim 5, wherein said plurality of processor circuits further receive said plurality of enable signals and selectively process said data based on said plurality of enable signals.

7. The controller of claim 1, wherein said plurality of address generation circuits further selectively generate a plurality of enable signals, depending upon a difference between an input base address and a processor base address in each of said plurality of address generation circuits.

8. A method of processing a plurality of data streams in a digital subscriber line (DSL) system, comprising the acts of:
   calculating a plurality of input addresses for said plurality of data streams based on a plurality of input base addresses and a plurality of input offset addresses;
   storing a plurality of data from said plurality of data streams according to said plurality of input addresses;
   calculating a plurality of processor addresses for the stored plurality of data based on a plurality of processor base addresses and a plurality of processor offset addresses;
   processing, using a single instruction, the stored plurality of data according to said plurality of processor addresses;
   calculating a plurality of output addresses for the processed plurality of data based on a plurality of output base addresses and a plurality of output offset addresses;
   outputting the processed plurality of data according to said plurality of output addresses; and
   updating said plurality of input base addresses, said plurality of processor base addresses, and said plurality of output base addresses.

9. The method of claim 8, wherein said plurality of data streams have independent data rates.

10. A single instruction, multi data (SIMD) architecture for controlling the processing of plurality of data streams, comprising:

a memory that stores data from said plurality of data streams received from a plurality of channels;

a processor, operatively coupled with said memory, that processes said data from said plurality of data streams; and a controller that controls said processor, wherein storing said data in said memory de-couples a first operating rate of said processor and a second operating rate of said plurality of channels.

11. A SIMD architecture as defined in claim 10, wherein said plurality of data streams are carried in respective ones of said plurality of channels.

12. The SIMD architecture of claim 10, wherein said plurality of data streams have independent data rates.

13. A method of controlling processing of multiple data streams in a single instruction, multi data (SIMD) architecture, comprising the steps of:
   storing data from said multiple data streams in a memory as said data is received;
   at regular intervals, determining whether all of said data has been received;
   providing a signal indicating that all of said data has been received;
   using said signal to determine which of said data to process; and
   processing said data in accordance with said signal.

14. A method as defined in claim 13, wherein said multiple data streams are carried in respective ones of a plurality of channels.

15. The method of claim 13, wherein said multiple data streams have independent data rates.

\* \* \* \* \*